United States Patent [19]
Yujiri

[11] 3,955,537
[45] May 11, 1976

[54] FEEDER WITH TIMED BATCH MIXING SYSTEM

[76] Inventor: Toshio Yujiri, 717 De Palma Way, Montebello, Calif. 90640

[22] Filed: Feb. 18, 1975

[21] Appl. No.: 550,818

[52] U.S. Cl. .............................................. 119/51.13
[51] Int. Cl.² ........................................... A01K 5/02
[58] Field of Search .............. 119/51.5, 51.13, 51.11

[56] References Cited
UNITED STATES PATENTS

| | | | |
|---|---|---|---|
| 2,500,243 | 3/1950 | Dixon | 119/51.13 |
| 3,196,835 | 7/1965 | Bergevin | 119/51.5 X |
| 3,646,913 | 3/1972 | Jenkins | 119/51.13 |
| 3,741,162 | 6/1973 | Lopez | 119/51.5 X |

*Primary Examiner*—Hugh R. Chamblee
*Attorney, Agent, or Firm*—Edmond F. Shanahan

[57] ABSTRACT

An animal feeder for automatically preparing a fresh food batch of mixed liquids and solids in an animal's feeding dish, at pre-set timed intervals.

The feeder is substantially a three-level structure. At the top level, a hopper compartment contains a hopper rotor rotatable about a vertical axis; the hopper rotor includes several hoppers, each containing one batch of food solid granules.

A motor compartment under the hopper compartment contains the hopper driving motor, and preferably, the timing instrumentation for controlling the feeder. At the lowest level, is a food dish compartment containing the animal's feeding dish.

A chute is provided between the hopper compartment and the feeding dish. At each feeding period, the motor rotates the hopper rotor through a few degrees of angle of rotation to place a full hopper just above the chute. The bottom of each hopper is a flap which drops when the hopper comes into position above the chute, and the food solids contents of the hopper is delivered through the chute to the animal's feeding dish.

The system includes valve control and liquid component delivery means for delivering the liquid component, usually water, in a predetermined quantity, to the animal's feeding dish to mix with the foods solids component and produce a freshly prepared food batch.

5 Claims, 9 Drawing Figures

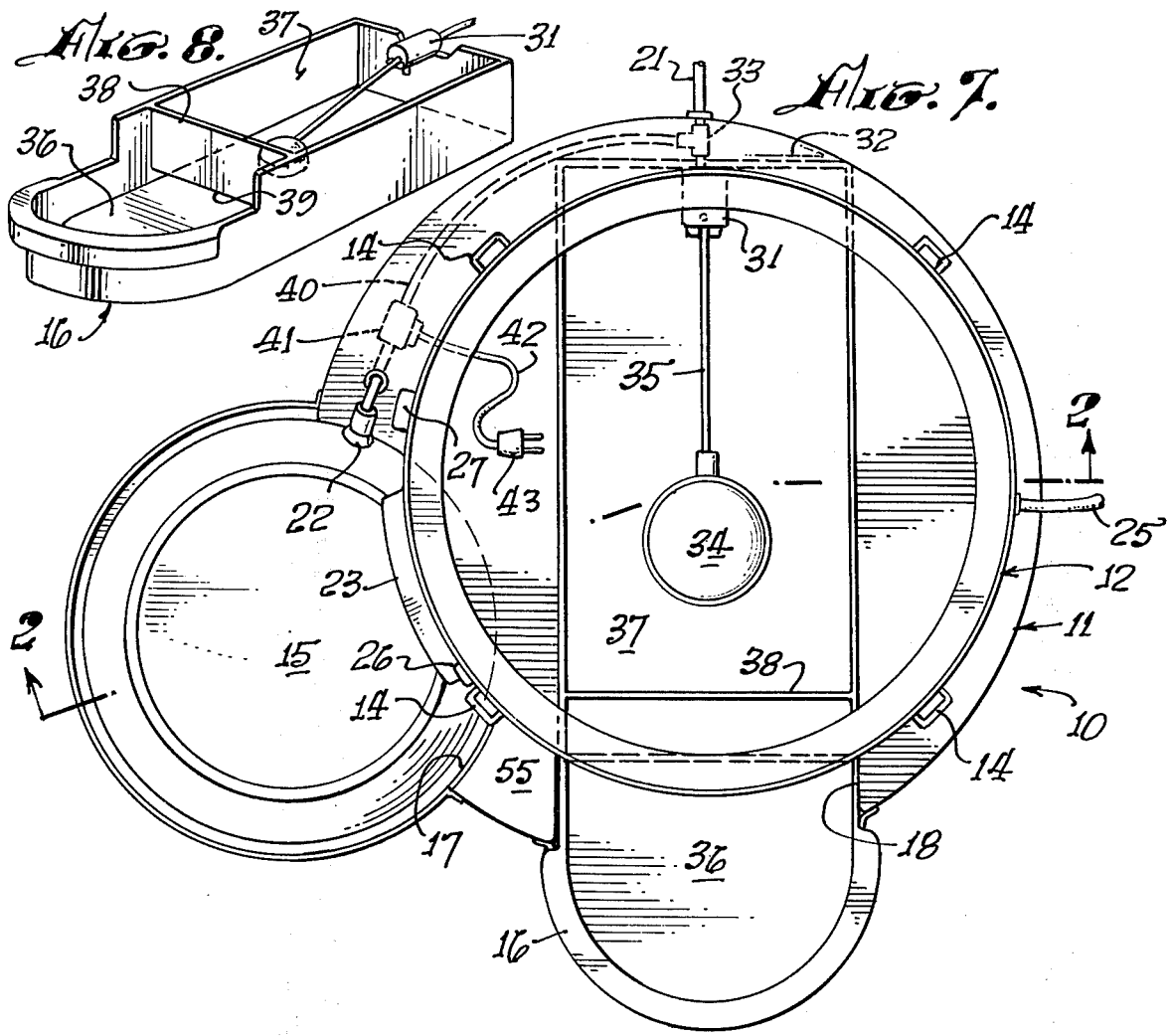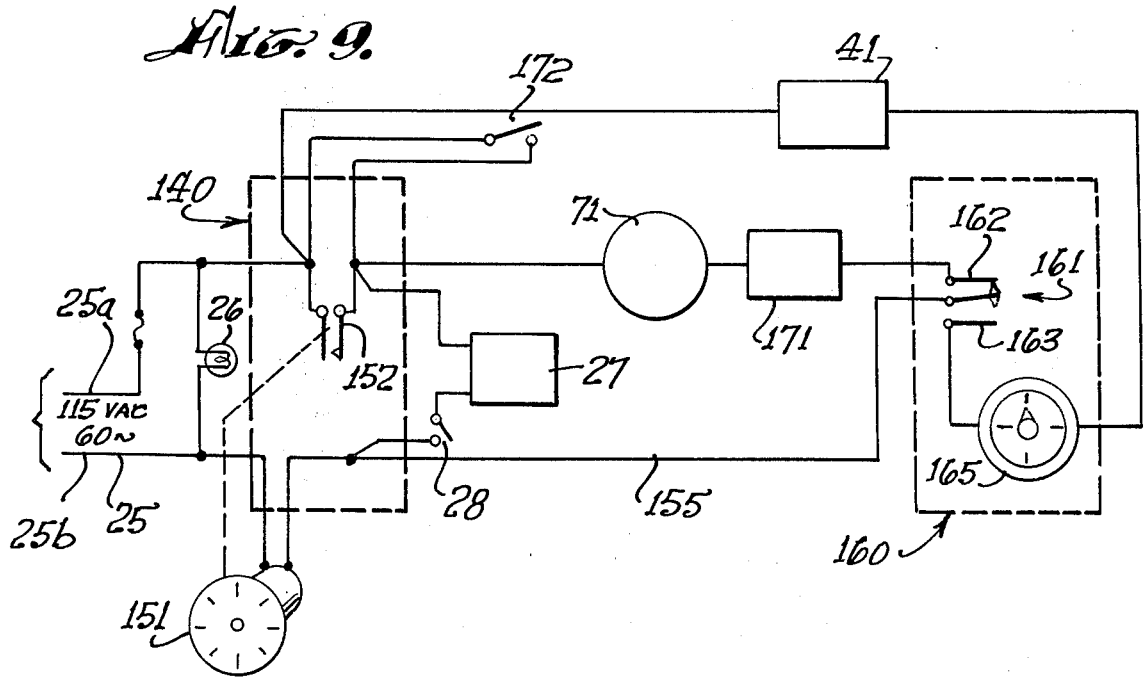

FEEDER WITH TIMED BATCH MIXING SYSTEM

BACKGROUND OF THE INVENTION

The feeder of the present invention was invented for the purpose of feeding a pet animal, and is especially adapted to that purpose, although its utility is not restricted to pet feeding. However, it differs radically from automatic feeders in the past, which have generally been designed for farm animals, or for pet animals kept in a kennel, rather than in the home of the pet owner.

Most of the feeders of the past have been designed for the feeding of a number of animals, and have made delivery upon some demand action of the animal, or by consumption of the food. The present feeder delivers an exactly predetermined amount of food, suitable for one animal or perhaps for two or three animals accustomed to eat from the same dish.

Animal feeders heretofore known do not make a freshly prepared batch of food at each feeding interval. Instead the feeder is loaded with prepared food; this restricts the food which may be used, or if perishable food is used, it becomes stale within the feeder at each successive day. The feeder of the present invention makes use of dehydrated food granules, which have become a standard type of high quality food for animal pets. These granules may be mixed with water to produce a fresh-tasting food portion. Obviously, some liquid component other than water, may be used as the liquid food component. For example, a water solution of certain nutrients, salts, etc., might be suitable for a particular type of pet animal.

The feeder of the present invention is intended to be left unattended, as the animal's only source of food and water for several days. The feeder of the present invention achieves much higher standards of reliability of operation than has been required or found in previously known feeders intended to be used with a human attendant in daily attendance.

In the feeder of the present invention, the food pellets or granules required for several days are already stored in the feeder, and separated into individual daily batches. Moreover, these batches are stored within the upper part of the feeder, the hoppers being disposed about the axis of a rotating system, so that only a small angle of rotational advancement is required for delivery of each successive food batch.

The drive motor and timing system are securely enclosed below the rotatable system of pre-portioned feed batches. The motor load is very small, and periods of motor operation are very short; consequently, electrical failure is extremely improbable, provided the power supply line is shielded from accidental disconnection by the animal pet itself.

Delivery of each feed batch is by a simple gravity system. The entire bottom of each food batch hopper is a hinged flap, which falls into an open position, when the individual hopper advances to a food delivery chute opening. The feed chute is substantially vertical, since it descends directly from below the food hopper rotating system, through the motor compartment of the feeder, to the feeding location.

In the preferred form of the invention, a reliable water supply is provided in a drinking trough and reservoir which is located in the lowest part of the feeder, and provides substantially stabilizing weight.

The feeder is constructed to be substantially petproof, for pets other than the primates. The feeding dish and water trough cannot be removed by a dog or cat, and the feeder itself is stable against being knocked over, except by animals much larger and heavier than the average household pet.

The foregoing and other objects and advantages of the invention will be understood from the following description of a preferred specific embodiment, which description should be read with reference to the accompanying drawings in which:

FIG. 1 is a perspective view of the feeder, showing both the food dish and the drinking water trough;

FIG. 2 is a vertical sectional view, as viewed at a vertical plane through the vertical axis of the food delivery system, as indicated by the arrows 2—2 in FIG. 1;

FIG. 3 is a plan view of the feeder of FIGS. 1 and 2, but with the cover removed from the food delivery system to reveal the hopper rotor, and the eight sectorial hoppers comprised in said rotor;

FIG. 4 is a vertical sectional detail view of one of said hoppers, and adjacent parts of the food delivery system, as viewed from the outer cylindrical surface indicated in FIG. 3 by the arrows 4—4;

FIG. 5 is a perspective view of the hopper rotor, with a portion of the outer cylindrical wall broken away to reveal the bottom flap of one hopper;

FIG. 6 is a detail perspective view showing the drive shaft and bearing by which rotational drive is transmitted from the motor to the hopper rotor;

FIG. 7 is a plan view of the base with the automatic food delivery system removed to reveal the drinking water trough and the food dish;

FIG. 8 is a perspective view of the drinking water trough, and of the float-controlled water supply valve; and FIG. 9 is a wiring diagram for the circuit employed in the operation of the feeder.

Housing 12 is detachably attached to the top of base 11 by means of a number of peripheral toggle latches 14.

Figure 1:
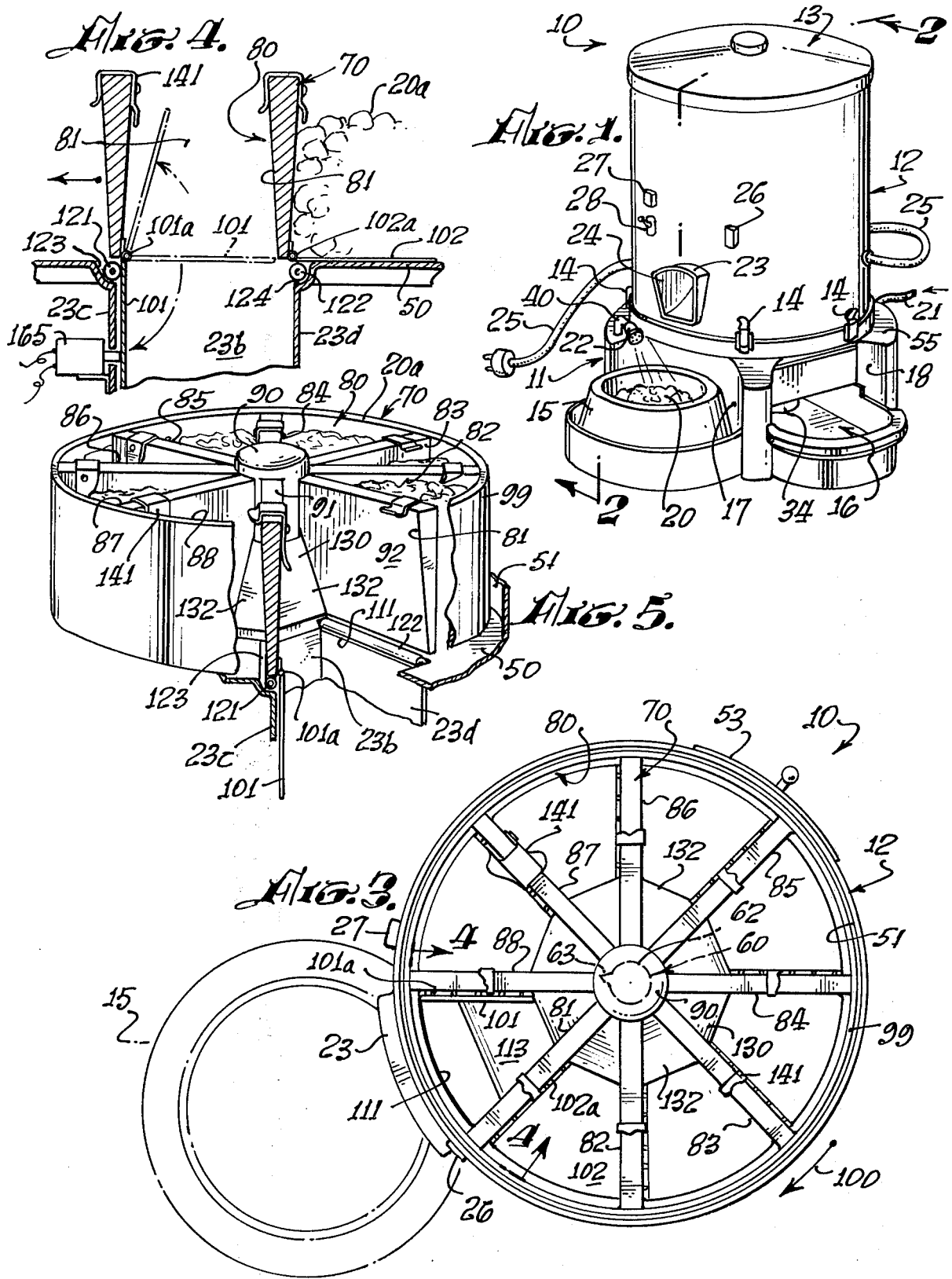
In FIG. 1, which is a perspective view of a preferred form of the invention, including a number of optional refinements, the visible parts of the feeder, indicated generally by the numeral 10, are principally, a substantially cylindrical base 11, a substantially cylindrical housing 12, and a removable housing cover 13.

Also visible in FIG. 1 are the feeding dish 15 and the water trough 16, which are closely received in mating compartments in base 11, designated as feeding dish compartment 17 and water trough compartment 18.

The dehydrated food granules are stored inside of feeder 10, in eight single-batch hoppers, as will be described hereinafter. One batch of food granules is seen in the feeding dish 15 at 20. Water, for mixing with food granules 20, and also for maintaining a drinking water level in water trough 16, is supplied from an external source by water line 21, which probably enters base 11. At proper feeding intervals, by means to be described hereinafter, a portion of water is delivered to food granules 20 in the feeding dish 15 by a water spray 22, seen just above feeding dish compartment 17. It will be understood that water line 21 might also supply some water mixture of nutrients or any suitable liquid for mixing with the food batch 20.

One batch of food granules, such as food granules 20, is delivered to the feeding dish 15, at timed feeding periods, from a chute 23, for which the lower discharge chute opening 24 is visible in FIG. 1.

Electric power, for the operation of a motor and timer system to be described hereinafter, is supplied to feeder 10 by power supply line 25. It is preferred to introduce the power supply line into housing 12, rather than into base 11, as will be apparent hereinafter.

As indicator light 26 is illuminated when the feeder 10 is in operation. Typically, a user may be departing from his home for a period of several days, leaving his pet animal in a confined place, with no source of food or water other than feeder 10. It is, therefore, important to provide indicator light 26, so that the user, at the time of departure, can be assured that feeder 10 has been placed in operation. There is no visible or audible indication that feeder 10 is operating, except once each day (or other feeding period) when a fresh food batch is delivered to and mixed in feeding dish 15.

Another optional preferred feature is the provision of a buzzer 27, which will sound at each feeding period, to summon the animal which has been trained to recognize its significance. An on-off switch 28 for buzzer 27 is provided.

Figure 2:
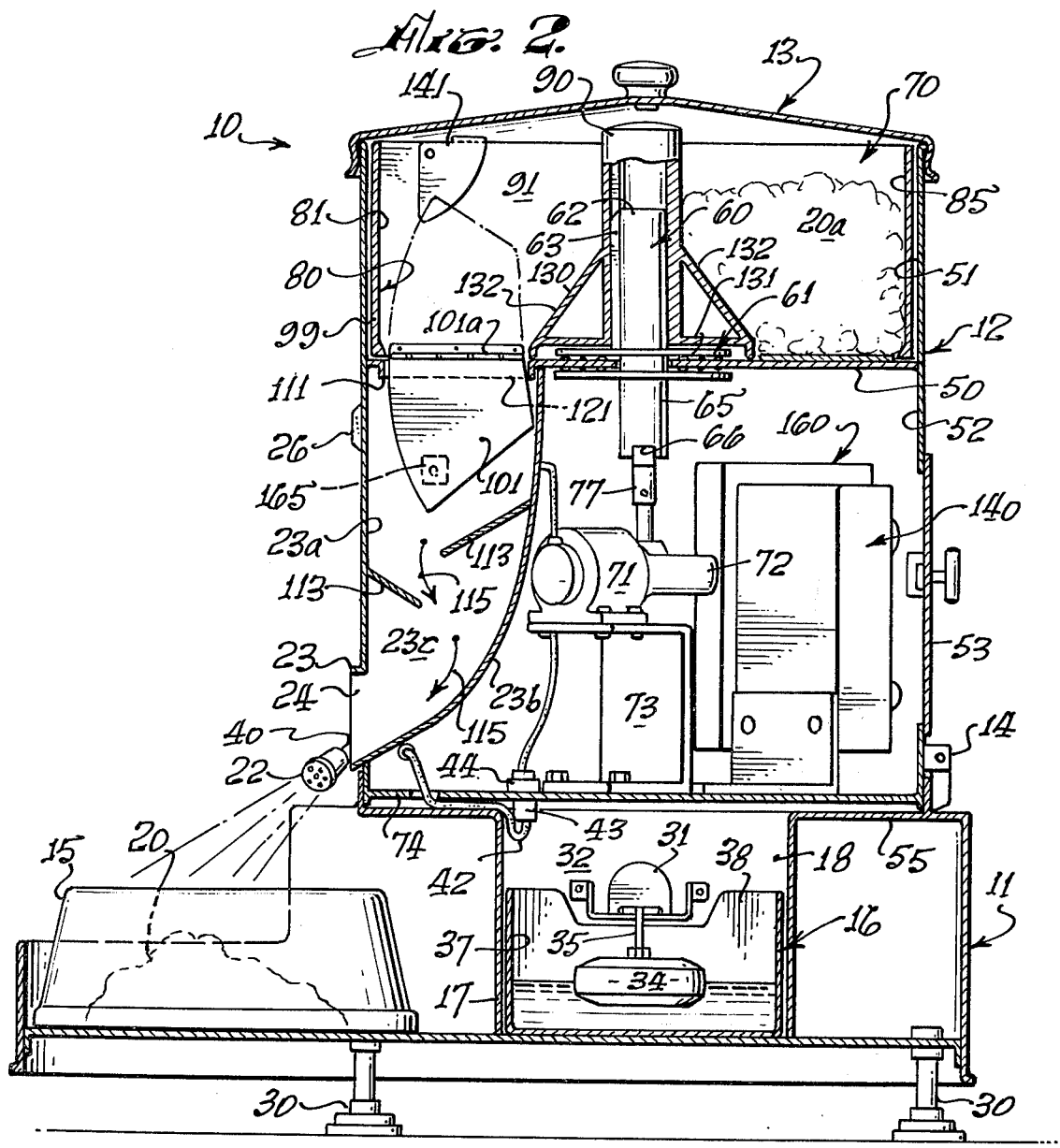

The internal construction of feeder 10 is revealed by the vertical sectional view of FIG. 2. It is seen that base 11 and housing 12 are modular units, which may be readily attached to, or separated from, one another, by means of latches 14. (A single electrical plug connection is also required, as will be described in connection with FIG. 7.) Base 11 contains all of the water connections and water storage, but contains none of the electrical system, except for an electrically controlled water valve to be described in connection with FIG. 7. Housing 12, on the other hand, contains all of the dry food storage and food delivery system, and substantially all electrical equipment, but does not contain any water connections.

The detailed construction of base 11, and its associated parts, will first be described, with particular reference to the lower part of FIG. 2, FIG. 7, and FIG. 8. As seen in FIG. 2, it is a preferred form of construction to support base 11 above floor level on 3 or more feet 30, two being seen in FIG. 2. At least one of these feet is preferably adjustable to provide for leveling, thereby minimizing spillage from water trough 16.

A preferred construction for water trough 16 is illustrated in perspective in FIG. 8. The disposition of water trough 16 within base 11 is seen in plan view in FIG. 7. Water is maintained in trough 16, at a predetermined level, by a float-controlled water valve 31, which is permanently mounted on an inner wall surface 32 of base 11. Float-controlled valve 31 is supplied with water by water supply line 21, and tee 33. When float 34 descends below a predetermined level, arm 35 causes the float-controlled valve 31 to deliver water to water trough 16. Although floatcontrolled valve 31 is also illustrated in FIG. 8, it will be understood that it is not connected to water trough 16 in any way. Consequently, water trough 16 can be readily removed from water trough compartment 18 for cleaning purposes. In the preferred construction of FIG. 8, water trough 16 is seen to be separated into a drinking section 36 and a storage section 37 by a baffle 38; however, free flow of water between the two sections is permitted by opening 39 under baffle 38.

A portion of water (or other liquid, if desired) is delivered periodically to food dish 15 by a branch water line 40, enclosed within base 11, and seen in dashed outline in the plan view of FIG. 7. The intake end of branch line 40 connects to tee 33. Branch line 40 discharges into the food dish 15 through mixing nozzle 22. Intermittent passage of a predetermined portion of water through line 40 to the feeding dish 15 is permitted by electrically controlled valve 41. Valve 41 is connected electrically to the food delivery system housed within housing 12, in a manner to be described hereinafter, by means of an electric line 42, which begins at valve 41 in dashed outline, in FIG. 7, since it is partially housed in the interior of base 11. The male connector end 43 is connected upon assembly by plugging into an electrical receptacle 44, in the bottom wall or other lower wall structure portion of housing 12, for example, as seen in the sectional view of FIG. 2.

Housing 12 contains the food delivery system, including drive motor, and a timer system. As seen in the upper part of the sectional view of FIG. 2, housing 12 is divided by a horizontal intermediate wall 50 into an upper hopper compartment 51 and a lower motor compartment 52. Ready access to hopper compartment 51 is gained by simply removing cover 13. Access to motor compartment 52 is gained by means of access door 53.

Since the means for periodic delivery of a batch of dry food particles is based upon a system rotating about a vertical axis, it is a preferred construction that housing 12 be substantially cylindrical, and that at least part of the upper wall structure 55 of base 11, comprise a substantially circular platform for support of a cylindrical housing 12.

Figure 6:
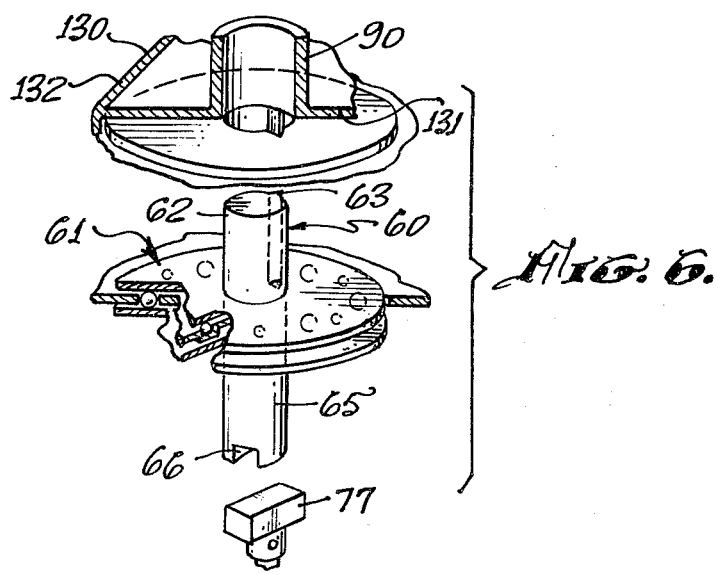

A relatively short drive shaft 60, seen in assembly in FIG. 2, and in detail in FIG. 6, is rotatably mounted in the center of intermediate wall 50 by means of a bearing 61, which is preferably of an anti-friction type such as the ball bearings illustrated. Drive shaft 60 is vertically disposed, with an upper end 62 bearing a key 63, projecting upwardly into rotor compartment 51. A lower end 65 projects downwardly into motor compartment 52, and is provided with means for coupling to a driving motor system, to be described hereinafter, by transverse slot 66.

A hopper rotor 70, is received is received on upper end 62. A drive motor 71, preferably provided with a right angle reduction gear system 72, is mounted on a support pedestal 73 on the floor 74, of motor compartment 52. The upwardly projecting drive member 77 of reduction gear 72 couples with slot 66 to rotate drive shaft 60 at intermittent periods as will be described hereinafter.

The detailed construction of hopper rotor 70 is revealed by FIGS. 3, 4 and 5. Hopper 70 which may be conveniently fabricated as a plastic molding, comprises wall structures which divide its interior into 8 sectorial hopper compartments, indicated collectively by the numeral 80, and individually by the numerals 81 to 88, in FIG. 3. Each of the hoppers 80 has a capacity for one feeding batch of dried food granules, as typically indicated by the numeral 20a in FIG. 5.

The wall structure of rotor 70 which forms the hoppers 80, is fully revealed by the plan view of FIG. 3, and the perspective view, partially broken away, of FIG. 5. Rotor 70 is seen to be comprises principally of a vertical axial sleeve 90, a cylindrical outer wall 99, and 8 vertically disposed radial walls, typically walls 91 and 92, which form two sides of hopper 81. As will be explained hereinafter, motor 71 periodically rotates rotor 70 in a clockwise direction (looking down in the plan view of FIG. 5) as indicated by the arrow 100. Consequently, wall 91 may be referred to as the leading wall of hopper 81, and wall 92 as its following wall.

Each of hoppers 81-88 is open at its upper end, and may be loaded with food granules 20a, since removal of cover 13 exposes all hoppers 81-88 to view as in plan view of FIG. 3. The bottom of each of the hoppers 81-88 is normally closed by a hinged bottom flap, bottom flap 101 of hopper 81 being shown lowered into the open position and bottom flap 102 of hopper 82 being shown in the horizontally disposed closed position. Each of the bottom flaps 101 and 102 (and the other 6 bottom flaps are identical in construction) is hinged to the lower edge of the leading wall, 91 for hopper 81, by a radially aligned hinge, 101a for bottom flap 101, and 102a for bottom flap 102.

At each feeding time, a timer system to be described hereinafter operates motor 71, to rotate hopper 70 in the direction of arrow 100, through an angle of rotation sufficient to bring one of hoppers 80 loaded with a batch of food granules 20a, into position over an upper chute opening 111; in FIGS. 3 and 5, opening 111 is seen to be constructed as a sectorial opening in horizontal intermediate wall 50, which constitutes the bottom of rotor compartment 51.

Chute 23 is seen in vertical section in the vertical sectional view of FIG. 2. Chute 23 provides an enclosed passage for the successive feed batches from each of the hoppers 81-99, in turn, to feeding dish 15. The chute 23 is entirely enclosed in motor compartment 52, its walls being comprised of a part 23a of the outer cylindrical wall of housing 12, and interior wall 23b (both seen in FIG. 2), and generally sectorial sidewalls 23c and d (seen in fragmentary detail in the perspective view of FIG. 5). Preferably, the rate of descent of the food granules is reduced by internal chute baffles 113, and the granules descend in a deflected path indicated by arrows 115.

For the 7 hoppers not positioned immediately above the upper chute opening 111 (hoppers 82-88), all bottom flaps are supported by horizontal intermediate wall 50 in a horizontal closed position as shown for bottom flap 102 during the intermittent rotation of hopper 70, the bottom flaps 91, 92, etc., slide along the upper surface of intermediate wall 50 in a closed position until each in turn reaches opening 111. Thus, as each of hoppers 81-88 arrives in the position illustrated for hopper 81, the bottom flap drops to the position assumed by bottom flap 101 in FIGS. 3, 4, and 5, discharging one batch of food granules into feeding dish 15. At the next feeding time, hopper 70 is again rotationally advanced in the direction of arrow 100, through an angle corresponding to one of hoppers 81-88, and the vertically disposed gate 101 is thereby forced upward to the closed position shown for bottom flap 102. Preferably, the opening and closing of the bottom flap 101 is facilitated by a pair of radially disposed rollers, 121 and 122, recessed downwardly into horizontal intermediate wall 70 in radially disposed roller grooves 123 and 124.

Rotor 70 is supported on bearing 61 by means of a conical structure 130 comprising the lower part of rotor sleeve 90. The base 131 of the conical structure 130 rests directly on the upper surface of the bearing 61. Also, the conical outer sidewalls 132 of conical structure 130 comprise a part of the wall structure of each of the hoppers 81-88, and serves to deflect descending food granules outwardly toward upper chute opening 111.

The interior surface of sleeve 90 is provided with a vertical key way mating with key 63 to provide driving engagement between the upper end 62 of drive shaft 60 and hopper 70. However, it will be appreciated that hopper 70 is retained in position on upper end 62 and bearing 61 by gravity only, so that, when servicing or cleaning is necessary, one may simply remove cover 13, and then lift hopper 70 vertically upwards and out of hopper compartment 51. When this is done, it is preferable to provide a retainer 141 on the upper edge of each sectorial wall 91-98, by means of which each of the bottom flaps 81-88 may be retained in an upwardly deflected vertical position for convenience in handling rotor 70 during servicing.

It is another preferred modification of the invention, that the interior wall surfaces of sectorial walls 91-92, etc., be downwardly diverging from one another to facilitate food delivery, and to insure that the particular hopper is completely emptied.

The intermittent operation of motor 71, to achieve the periodic feeding desired, is achieved by means of a timing system, indicated generally by the numeral 140, and housed within motor compartment 52. The physical disposition of timing system 140 is indicated generally in the vertical sectional view of FIG. 2. However, its operation will be better understood from the schematic wiring diagram of FIG. 9. In FIG. 9, the conduits 25a and 25b of power supply line 25 are shown as including a fuse 25c, and as being bridged by indicator light 26. Power from conductors 25a and 25b drives motor 71 for a predetermined time, usually a few seconds, at each feeding period, typically every 24 hours. In a typical sequence, a 24-hour timer 151 permits the supply of power to the system for 10 seconds, by closing a switch 152.

In the motor circuit, indicated generally by the numeral 155 is a second, short-period timer 160, containing a two-position switch 161, having a motor drive position 162 and a water mixing position 163.

As motor 71 advances rotor 70 in the direction 100, gate 101 drops into the chute opening 111, and strikes a microswitch 165, best seen in FIG. 4. This immediately switches switch 161 from the motor position 162 to the water mixing position 163. Motor 71 stops turning, and water begins to be delivered by water solenoid 41 to feeding dish 15 through water nozzle 22.

Once started, water solenoid 41 continues for a predetermined watering period, for example 15 seconds, regardless of the interruption of electrical power. However, by the time power is shut off by 24-hour timer 151, switch 161 returns the motor drive position 162, although motor 71 does not begin turning, since there will not be any power in the system again for another 24 hours.

During the 10-second period, buzzer 27 is sounding, if desired, and switch 28 is closed. If desired, an electrical speed adjustment means 171 may be included in motor circuit 155. Also, it may be desired to include a test switch 172 in parallel with 24-hour timer switch 152, so that an operator may test the operation of feeder 10 between the 24-hour timer periods.

I claim:

1. A feeder for providing a continuously maintained supply of drinking water, and a periodic delivery of a freshly prepared food batch comprised of food granules mixed with water, which feeder comprises:
- a base having an upper wall structure comprising a substantially circular platform, and a lower wall structure comprising a feeding dish compartment and a water trough compartment below said platform;
- a feeding dish in said feeding dish compartment;
- a water trough in said water trough compartment, and having a drinking opening extending to one side of said platform;
- a float-controlled water supply valve, connected to a water supply and mounted on the walls of said water trough compartment in association with said drinking water trough to continuously maintain a predetermined level of drinking water in said trough;
- a food delivery system mounted on said platform and comprising:
  - a substantially cylindrical housing surmounted by a removable cover, and detachably latched to said platform, said housing including a substantially horizontal intermediate wall dividing the interior of said housing into an upper hopper compartment and a lower motor compartment;
  - a drive shaft, disposed vertically at the axis of said housing, and rotatably mounted in said horizontal wall structure, said drive shaft including motor coupling means at its lower end in said motor compartment, and key means in its upper end in said hopper compartment;
  - a hopper rotor received on the upper end of said drive shaft in said hopper compartment and mating with said key means of said drive shaft, and said hopper rotor having radial walls defining a plurality of sectorial hoppers;
  - a motor means in said motor compartment coupled to said drive shaft for rotational drive of said hopper rotor in an advancing direction;
  - a flap comprising the bottom of each sectorial hopper, each said flap being hinged to one of said radial walls on the leading side of its corresponding hopper;
  - a chute for delivery of food granules from one of said sectorial hoppers to said food dish, said chute including a chute opening under said hopper rotor in said hopper compartment, said chute opening mating with the bottom flap of each sectorial hopper, in turn, as said hopper rotor is rotated in said advancing direction, to permit the drop of said flap and the discharge of the contents of said hopper through said chute to said food dish;
  - a mixing water delivery system including a line from said water supply, a nozzle discharging into said food dish, a timer-controlled valve in said mixing water line for delivery of water for a predetermined period, upon each actuation; and switch means for actuating said timer valve upon each delivery of food granules through said chute to said food dish; and
  - a feeding timer system for actuating said motor at each feeding period to drive said hopper rotor sufficiently to advance to the next successive food hopper.

2. A feeder as described in claim 1 in which the walls of said sectorial hoppers are downwardly diverging to insure against clogging of food particles in said hopper.

3. A feeder as described in claim 1 in which radially disposed roller supports for said flaps are provided at the sides of said chute opening to facilitate the movement of said flap during opening and reclosing 4. A feeder for the fresh preparation in an animal feeding dish of a batch mixture of a solid component and a liquid component, at predetermined feeding periods, which feeder comprises:
- a substantially cylindrical housing, open at the top, including a horizontal intermediate wall dividing the interior of said housing into an upper hopper compartment and a lower motor compartment;
- a removable cover for said top opening of said housing:
- a feeding dish located adjacent said housing at an elevation below said intermediate wall;
- a vertically disposed drive shaft rotatably mounted in said intermediate wall;
- a hopper rotor releasably received into driving engagement on the upper end of said drive shaft, in said hopper compartment, said hopper rotor having radial walls defining a plurality of sectorial hoppers;
- a motor means in said compartment coupled to said drive shaft for rotational drive of said hopper rotor in an advancing direction;
- a plurality of flap bottoms, one for each of said sectorial hoppers, each said flap bottom being hinged to one of said radial walls on the side of its corresponding hopper, which is the leading side of said hopper when said hooper rotor is rotated in an advancing direction during operation;
- a chute for delivery of a batch of food solids from its corresponding hopper to said feeding dish, said chute including a chute opening under said hopper rotor, to mate successively with the flap bottoms of each of said hoppers, in turn, as said hopper rotor is rotated in said advancing direction by said motor;
- a liquid component delivery system including a line from a liquid component supply, a nozzle discharging from said line into said food dish, and a valve in said liquid component line; and
- a timer system for actuating said motor at each feeding period to drive said hopper rotor sufficiently to place each of said hoppers successively in alignment with said chute, and comprising means for actuating said timer valve in said liquid component line for a time sufficient to deliver one batch portion of said liquid component.

5. A feeder as described in claim 4, in which said timer system includes motor shut-off switch means located in said chute below the stopped position of a radial wall carrying said hinged flap bottom, said switch means being actuate by the dropping of said flap bottom when said hopper comes into alignment with said chute, for terminating the rotor advancement by said motor, said switch means being released at the beginning of the next rotor advancement cycle as said flap bottom is raised into closed position by engagement with said intermediate wall of said housing.

* * * * *